US012715377B2

(12) United States Patent
Kwon et al.

(10) Patent No.: US 12,715,377 B2
(45) Date of Patent: Aug. 25, 2026

(54) APPARATUS AND METHOD FOR DETECTING AN ABNORMAL ECU IN A VEHICLE NETWORK

(71) Applicants: HYUNDAI MOTOR COMPANY, Seoul (KR); KIA CORPORATION, Seoul (KR)

(72) Inventors: Hae Yun Kwon, Incheon (KR); Yong Joon Lee, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 85 days.

(21) Appl. No.: 18/769,080

(22) Filed: Jul. 10, 2024

(65) Prior Publication Data

US 2025/0289383 A1 Sep. 18, 2025

(30) Foreign Application Priority Data

Mar. 18, 2024 (KR) ........................ 10-2024-0037287

(51) Int. Cl.
*B60R 16/02* (2006.01)
*B60R 16/023* (2006.01)
*G07C 5/10* (2006.01)

(52) U.S. Cl.
CPC ............ *B60R 16/0232* (2013.01); *G07C 5/10* (2013.01)

(58) Field of Classification Search
CPC .............................. B60R 16/0232; G07C 5/10
See application file for complete search history.

(56) References Cited

U.S. PATENT DOCUMENTS

| | | | | |
|---|---|---|---|---|
| 8,583,305 | B2 | 11/2013 | Novak | |
| 9,390,569 | B2 | 7/2016 | Kurnik | |
| 11,146,082 | B2 * | 10/2021 | Kim | H02J 7/0029 |
| 11,575,538 | B2 * | 2/2023 | Takahashi | B60W 50/0205 |
| 11,848,755 | B2 * | 12/2023 | Takahashi | B60W 50/0205 |
| 12,089,048 | B2 * | 9/2024 | Goto | H04W 12/122 |
| 2019/0173912 | A1 * | 6/2019 | Ujiie | H04L 12/40 |
| 2019/0260790 | A1 * | 8/2019 | Kishikawa | H04L 67/12 |
| 2019/0319467 | A1 * | 10/2019 | Kim | H02J 7/0031 |
| 2020/0137099 | A1 * | 4/2020 | Haga | H04W 4/48 |
| 2020/0145251 | A1 * | 5/2020 | Hass | G06F 11/076 |
| 2020/0145437 | A1 * | 5/2020 | Torisaki | H04W 12/125 |
| 2020/0204395 | A1 * | 6/2020 | Takahashi | H04L 63/1425 |
| 2020/0342099 | A1 * | 10/2020 | Kerstein | H04L 63/1425 |

(Continued)

FOREIGN PATENT DOCUMENTS

| | | |
|---|---|---|
| JP | 2015199444 A | 11/2015 |
| JP | 2016149610 A | 8/2016 |
| JP | 2019084942 A | 6/2019 |

*Primary Examiner* — Tyler J Lee

(74) *Attorney, Agent, or Firm* — Lempia Summerfield Katz LLC

(57) ABSTRACT

An apparatus and a method for detecting an abnormal ECU in a vehicle network are provided. The apparatus detects an abnormal ECU with high accuracy by storing status information of a vehicle and status information of the vehicle network, determining an activation maintenance time of the vehicle network based on status information of the vehicle and status information of the vehicle network, monitoring the vehicle network during the activation maintenance time of the vehicle network, and detecting an ECU that wakes up abnormally first in a plurality of ECUs as an abnormal ECU.

14 Claims, 5 Drawing Sheets

(56) References Cited

U.S. PATENT DOCUMENTS

| | | | | |
|---|---|---|---|---|
| 2021/0399942 | A1* | 12/2021 | Yasunori | B60R 16/0232 |
| 2022/0001835 | A1 | 1/2022 | Kim | |
| 2022/0330025 | A1* | 10/2022 | Goto | H04W 4/48 |
| 2025/0026309 | A1* | 1/2025 | Sunny | H04W 12/121 |
| 2025/0284582 | A1* | 9/2025 | Andreasen | G07C 5/0841 |

* cited by examiner

APPARATUS AND METHOD FOR DETECTING AN ABNORMAL ECU IN A VEHICLE NETWORK

CROSS-REFERENCE TO RELATED APPLICATION

This application claims the benefit of and priority to Korean Patent Application No. 10-2024-0037287, filed in the Korean Intellectual Property Office on Mar. 18, 2024, the entire contents of which are hereby incorporated herein by reference.

TECHNICAL FIELD

The present disclosure relates to a technology for detecting an Electronic Control Unit (ECU) in which an abnormality (e.g., unusualness) occurs among a plurality of ECUs connected to a vehicle network.

BACKGROUND

As the electronicization of vehicle components progresses rapidly, the types and the number of electronic devices mounted on a vehicle have greatly increased. Electronic devices may be used in a power train control system, a body control system, a chassis control system, a vehicle network, a multimedia system, or the like. The powertrain control system may include an engine control system, an automatic transmission control system, or the like. The body control system may include a body electronics control system, a convenience device control system, a lamp control system, or the like. The chassis control system may include a steering device control system, a brake control system, a suspension control system, or the like. The vehicle network may include a controller area network (CAN), a FlexRay-based network, a media oriented system transport (MOST)-based network, or the like. The multimedia system may include a navigation system, a telematics system, an infotainment system, or the like.

Such systems and electronic devices of each system are connected through a vehicle network. The vehicle network is required to support the functions of each electronic device. The CAN may support transmission rates of up to 1 Mbps, automatic retransmission of collided frames, and error detection based on a cycle redundancy check (CRC). The FlexRay-based network may support transmission rates of up to 10 Mbps and may support simultaneous data transmission through two channels and synchronous data transmission. The MOST-based network, which is a communication network for high-quality multimedia, may support transmission rates of up to 150 Mbps.

A vehicle telematics system, an infotainment system, and an improved safety system of a vehicle require high transmission rates and system scalability. The CAN and the FlexRay-based network typically do not sufficiently support these systems. The MOST-based network may support higher transmission rates than those of the CAN and the FlexRay-based network. However, it costs a lot of money to apply a MOST-based network to all networks in a vehicle. Accordingly, an Ethernet-based network may be considered as a vehicle network. The Ethernet-based network may support bidirectional communication through a pair of wires and may support transmission rates of up to 10 Gbps.

Each of electronic devices connected through a vehicle network may be equipped with an ECU. Each ECU may transmit and receive a message containing various information at a preset transmission cycle in order to perform a specific function.

Among a plurality of ECUs connected to a vehicle network, there may be ECUs that wake up abnormally (or spontaneously activate) after the vehicle is turned off. Such ECUS may unnecessarily consume the battery power of the vehicle. This may cause battery discharge and adversely affect the operation (or function) of an ECU that normally wakes up.

A conventional technology for detecting an abnormal ECU among a plurality of ECUs connected to a vehicle network may ignore the fact that the ECU that wakes up abnormally first may arbitrarily wake up other ECUs, and may detect all ECUs that wake up abnormally as abnormal ECUs after the vehicle is turned off. In this case, actual normal ECUs may be incorrectly detected as abnormal ECUs.

Therefore, the conventional technology may not detect the ECU that woke up first among the plurality of ECUs that woke up abnormally after the vehicle is turned off. The conventional technology may thus mis-detect an actually normal ECU as an abnormal ECU.

The matters described in this Background section are only intended to enhance understanding of the background of the disclosure. Therefore, the Background section may include matters that are not already known to those of ordinary skill in the art.

SUMMARY

The present disclosure has been made to solve the above-mentioned problems occurring in the prior art while advantages achieved by the prior art are maintained intact.

Aspects of the present disclosure provide an apparatus and a method for detecting an abnormal ECU, in a vehicle network, that detect the abnormal ECU with high accuracy. The apparatus and the method store status information of a vehicle and status information of the vehicle network. The apparatus and the method determine an activation maintenance time of the vehicle network based on status information of the vehicle and status information of the vehicle network. The apparatus and the method monitor the vehicle network during the activation maintenance time of the vehicle network. The apparatus and the method detect an ECU that wakes up abnormally first in a plurality of ECUs as an abnormal (unusual) ECU.

Other aspects of the present disclosure provide an apparatus and a method for detecting an abnormal ECU, in a vehicle network, that detect cumulative mileage information of a vehicle, battery state of charge (SOC) information, and information about a plurality of ECUs that wake up abnormally for each network (hereinafter, referred to as ECU information) in a primary turn-off state of the vehicle. The apparatus and the method determine an activation maintenance time of a target network based on the cumulative mileage information, battery SOC information, and the ECU information of the vehicle in a secondary turn-off state of the vehicle. The apparatus and the method monitor the target network during the activation maintenance time of the target network. The apparatus and the method detect an ECU that wakes up abnormally first among the plurality of ECUs as the abnormal ECU.

Still other aspects of the present disclosure provide an apparatus and a method for detecting an abnormal ECU, in a vehicle network, that optimally control the abnormal ECU. The apparatus and the method determine an activation maintenance time of the vehicle network based on the status information of the vehicle and the status information of the vehicle network. The apparatus and the method monitor the vehicle network during the activation maintenance time of the vehicle network. The apparatus and the method detect an ECU that wakes up abnormally first in a plurality of ECUs as the abnormal ECU. The apparatus and the method control the abnormal ECU based on the status information of the vehicle.

Still other aspects of the present disclosure provide an apparatus for detecting an abnormal ECU, in a vehicle network, that take customized actions based on the SOC state of a battery. The apparatus and the method determine an activation maintenance time of a target network based on cumulative mileage information of a vehicle, battery SOC information, and ECU information. The apparatus and the method monitor the target network during the activation maintenance time of the target network. The apparatus and the method detect an ECU that wakes up abnormally first in a plurality of ECUs as the abnormal ECU. The apparatus and the method reset the abnormal ECU when the SOC of the battery exceeds a threshold. The apparatus and the method shut down the abnormal ECU when the SOC of the battery does not exceed a threshold.

The technical problems to be solved by the present disclosure are not limited to the aforementioned problems. Other technical problems not mentioned herein should be more clearly understood from the following description by those having ordinary skill in the art to which the present disclosure pertains. Also, it should be understood that the objects and advantages of the present disclosure may be realized by the units and combinations thereof recited in the claims.

According to an aspect of the present disclosure, an apparatus for detecting an abnormal ECU in a vehicle network is provided. The apparatus includes storage configured to store status information of a vehicle and status information of the vehicle network. The apparatus also includes a controller configured to determine an activation maintenance time of the vehicle network based on the status information of the vehicle and the status information of the vehicle network. The controller is also configured to monitor the vehicle network during the activation maintenance time of the vehicle network. The controller is further configured to detect an electronic control unit (ECU) that wakes up abnormally first in a plurality of ECUs as an abnormal ECU.

According to an embodiment, the status information of the vehicle may include at least one piece of cumulative mileage information of the vehicle and state of charge (SOC) information of a battery provided in the vehicle.

According to an embodiment, the controller may be configured to control the detected abnormal ECU based on an SOC of the battery.

According to an embodiment, the controller may be configured to reset the abnormal ECU when the SOC of the battery exceeds a threshold.

According to an embodiment, the controller may be configured to shut down the abnormal ECU when the SOC of the battery does not exceed a threshold.

According to an embodiment, the status information of the vehicle network may include information about a plurality of ECUs that wakes up abnormally for each detailed network of the vehicle network.

According to an embodiment, the controller may be configured to determine an activation maintenance time of a target network based on the cumulative mileage information of the vehicle and the SOC information of the battery, and the ECU information.

According to an embodiment, the controller may be configured to determine the activation maintenance time of the target network as a first time when a cumulative mileage of the vehicle does not exceed a threshold distance.

According to an embodiment, the controller may be configured to determine the activation maintenance time of the target network as a second time when the cumulative mileage of the vehicle exceeds a threshold distance and an SOC of the battery exceeds a threshold.

According to an embodiment, the controller may be configured to determine the activation maintenance time of the target network as a third time when the cumulative mileage of the vehicle exceeds a threshold distance, an SOC of the battery does not exceed a threshold, and there is no information history of an ECU that wakes up abnormally in the target network.

According to an embodiment, the controller may be configured to determine the activation maintenance time of the target network as a fourth time when the cumulative mileage of the vehicle exceeds a threshold distance, an SOC of the battery does not exceed a threshold, and there is an information history of an ECU that wakes up abnormally in the target network.

According to another aspect of the present disclosure, a method of detecting an abnormal ECU in a vehicle network is provided. The method includes storing, by storage, status information of a vehicle and status information of the vehicle network. The method also includes determining, by a controller, an activation maintenance time of the vehicle network based on the status information of the vehicle and the status information of the vehicle network. The method additionally includes monitoring, by the controller, the vehicle network during the activation maintenance time of the vehicle network. The method further includes detecting, by the controller, an electronic control unit (ECU) that wakes up abnormally first in a plurality of ECUs as an abnormal ECU.

According to an embodiment, the status information of the vehicle may include at least one piece of cumulative mileage information of the vehicle and state of charge (SOC) information of a battery provided in the vehicle.

According to an embodiment, the method may further include controlling, by the controller, the detected abnormal ECU based on an SOC of the battery.

According to an embodiment, controlling the abnormal ECU may include resetting, by the controller, the abnormal ECU when the SOC of the battery exceeds a threshold, and shutting down, by the controller, the abnormal ECU when the SOC of the battery does not exceed a threshold.

According to an embodiment, the status information of the vehicle network may include information about a plurality of ECUs that wakes up abnormally for each detailed network of the vehicle network.

According to an embodiment, determining the activation maintenance time of the vehicle network may include determining, by the controller, an activation maintenance time of a target network based on the cumulative mileage information of the vehicle and the SOC information of the battery, and the ECU information.

According to an embodiment, determining the activation maintenance time of the target network may include determining, by the controller, the activation maintenance time of the target network as a first time when a cumulative mileage of the vehicle does not exceed a threshold distance. Determining the activation maintenance time of the target network may also include determining, by the controller, the activation maintenance time of the target network as a second time when the cumulative mileage of the vehicle exceeds a threshold distance and an SOC of the battery exceeds a threshold. Determining the activation maintenance time of the target network may additionally include determining, by the controller, the activation maintenance time of the target network as a third time when the cumulative mileage of the vehicle exceeds the threshold distance, an SOC of the battery does not exceed a threshold, and there is no information history of an ECU that wakes up abnormally in the target network. Determining the activation maintenance time of the target network may further include determining, by the controller, the activation maintenance time of the target network as a fourth time when the cumulative mileage of the vehicle exceeds the threshold distance, the SOC of the battery does not exceed the threshold, and there is the information history of the ECU that wakes up abnormally in the target network.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Figure 1:
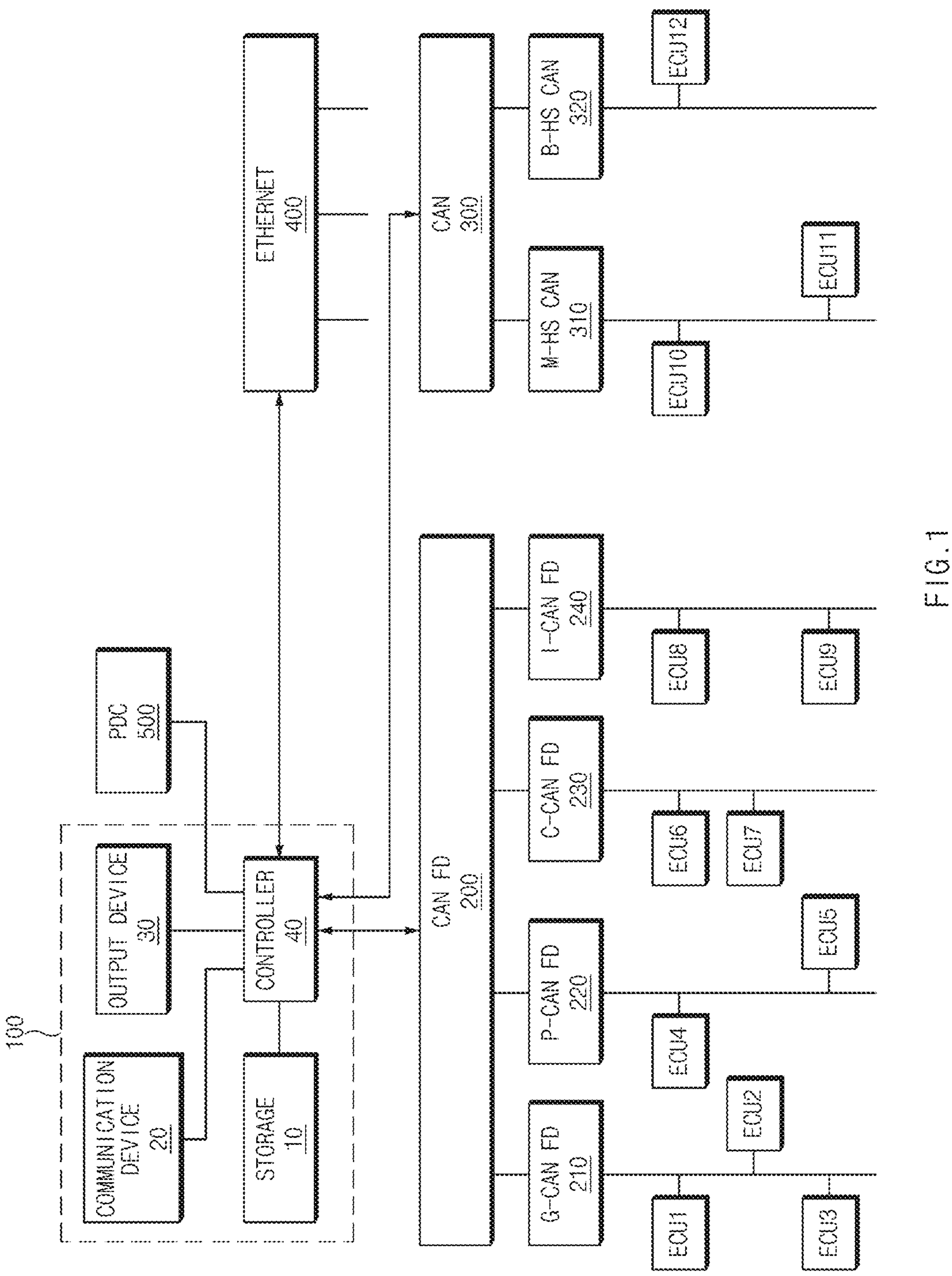
FIG. 1 is a block diagram illustrating a configuration of an apparatus for detecting an abnormal ECU in a vehicle network, according to an embodiment of the present disclosure.

Hereinafter, embodiments of the present disclosure are described in detail with reference to the accompanying drawings. In adding the reference numerals to the components of the drawings, it should be noted that the identical or equivalent components are designated by the identical numeral even when the components are displayed on different drawings. Further, in describing the embodiment of the present disclosure, a detailed description of the related known configuration or function has been omitted where it was determined that the detailed description would obscure the gist the present disclosure.

In addition, terms, such as first, second, A, B, (a), (b) or the like may be used herein when describing components of the present disclosure. The terms are provided only to distinguish the elements from other elements. The essences, sequences, orders, and numbers of the elements are not limited by the terms. In addition, unless defined otherwise, all terms used herein, including technical or scientific terms, have the same meanings as those generally understood by those having ordinary skill in the art to which the present disclosure pertains. The terms defined in the generally used dictionaries should be construed as having the meanings that coincide with the meanings of the contexts of the related technologies. The terms should not be construed as ideal or excessively formal meanings unless clearly defined in the specification of the present disclosure.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram illustrating a configuration of an apparatus for detecting an abnormal ECU in a vehicle network, according to an embodiment of the present disclosure.

As shown in FIG. 1, an apparatus 100 for detecting an abnormal ECU in a vehicle network according to an embodiment of the present disclosure may include storage 10, a communication device 20, an output device 30, and a controller 40. Depending on a scheme of implementing the apparatus 100 for detecting an abnormal ECU in a vehicle network according to embodiments of the present disclosure, components may be combined with each other to be implemented as one and/or some components may be omitted.

In an embodiment, a vehicle network may include a controller area network with flexible data rate (CAN FD) 200, a CAN 300, an Ethernet 400, or the like. The CAN FD 200, which is a detailed network (or a domain network), may include a gravity sensor (G)-CAN FD 210, a powertrain (P)-CAN FD 220, a chassis (C)-CAN FD 230, and an infrared sensor (I)-CAN FD 240. The CAN 300, which is a detailed network (or a domain network), may include a motor-high speed (M-HS) CAN 310 and a body-high speed (B-HS) CAN 320. In addition, the C-CAN 230, which is a network capable of transmitting data at a high rate, may include an engine control unit (ECU), a transmission control unit (TCU), or the like.

The storage 10 may store status information of a vehicle and status information of the vehicle network. The status information of the vehicle may include cumulative mileage, door locked status, door open/closed status, trunk open/closed status, smart key (SMK) operation status, battery SOC status, or the like. The status information of the vehicle network may include information about an ECU that wakes up abnormally and network information (i.e., information about a network to which the ECU woken up abnormally is connected) corresponding to the ECU information.

The storage 10 may store various logic, algorithms, and programs required in the process of determining an activation maintenance time of the vehicle network based on the status information of the vehicle and the status information of the vehicle network, monitoring the vehicle network during the activation maintenance time of the vehicle network, and detecting an ECU that wakes up abnormally first in a plurality of ECUs as an abnormal ECU. The storage 10 may store wake-up schedule information of all ECUs.

The storage 10 may store cumulative mileage information of the vehicle and battery state of charge (SOC) information of the battery. The storage 10 may also store abnormally wake-up ECU information for each network (or information about a plurality of ECUs) obtained when the vehicle is in a primary turn-off state. Each network may include the CAN FD 200, the CAN 300, and the Ethernet 400. For example, each network may include the G-CAN FD 210, the P-CAN FD 220, the C-CAN FD 230, the I-CAN FD 240, the M-HS CAN 310, and the B-HS CAN 320.

The storage 10 may additionally, or alternatively, store various logic, algorithms, and programs required in the process of determining an activation maintenance time of a target network based on the cumulative mileage information, battery SOC information, and ECU information of a vehicle in a secondary turn-off state of the vehicle, monitoring the target network during the activation maintenance time of the target network, and detecting an ECU that wakes up abnormally first among the plurality of ECUs as the abnormal ECU. The secondary turn-off state of the vehicle refers to a state in which the vehicle is turned off again in a state that the vehicle is turned on after the primary turn-off state.

The storage 10 may additionally, or alternatively, store various logic, algorithms, and programs required in the process of determining an activation maintenance time of the vehicle network based on the status information of the vehicle and the status information of the vehicle network, monitoring the vehicle network during the activation maintenance time of the vehicle network, detecting an ECU that wakes up abnormally first in a plurality of ECUs as the abnormal ECU, and controlling the abnormal ECU based on the status information of the vehicle.

The storage 10 may additionally, or alternatively, store various logic, algorithms, and programs required in the process of determining an activation maintenance time of a target network based on cumulative mileage information of a vehicle, battery SOC information, and ECU information, monitoring the target network during the activation maintenance time of the target network, detecting an ECU that wakes up abnormally first in a plurality of ECUs as the abnormal ECU, resetting the abnormal ECU when the SOC of the battery exceeds a threshold, and shutting down the abnormal ECU when the SOC of the battery does not exceed a threshold.

The communication device 20 may be a module that provides a communication interface with a mobile terminal of a customer. The communication device 20 may transmit a message of notifying the detection of an abnormal ECU to the mobile terminal under control of the controller 40. The communication device 20 may include at least one of a mobile communication module, a wireless Internet module, or a short-range communication module.

The mobile communication module may communicate with the mobile terminal through a mobile communication network constructed according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), or the like).

The wireless Internet module may be a module for wireless Internet access. The wireless Internet module may communicate with a mobile terminal through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like.

The short-range communication module may support short-range communication with a mobile terminal by using at least one of Bluetooth™, radio frequency identification (RFID), infrared data association (IrDA), ultra-wideband (UWB), ZigBee, near field communication (NFC), and wireless universal serial bus (USB) technology.

The output device 30 may include a display device and output information about an abnormal ECU detected by the controller 40.

The controller 40 may be electrically connected to each component and may perform overall control such that each component performs its function. The controller 40 may be implemented in the form of hardware or software or may be implemented in a combination of hardware and software. Preferably, the controller 40 may be implemented as a microprocessor. However, the disclosure is not limited thereto. For example, the controller 40 may be implemented as a central communication unit (CCU).

The controller 40 may determine the activation maintenance time of the vehicle network based on the status information of the vehicle and the status information of the vehicle network stored in the storage 10. The controller 40 may also monitor the vehicle network during the activation maintenance time of the vehicle network. The controller may detect an ECU that wakes up abnormally first in a plurality of ECUs as an abnormal ECU. The status information of the vehicle may include cumulative mileage, door locked status, door open/closed status, trunk open/closed status, SMK operation status, battery SOC status, or the like. The status information of the vehicle network may include information about an ECU that wakes up abnormally, network information corresponding to the ECU information, or the like. When an ECU that must remain in a sleep state (i.e., has no wake-up schedule) wakes up voluntarily, the controller 40 may detect the ECU as an ECU that wakes up abnormally.

The controller 40 may determine the activation maintenance time of the target network based on the cumulative mileage information of the vehicle and the battery SOC information, and information about an ECU that wakes up abnormally for each detailed network of the vehicle network.

Figure 2:
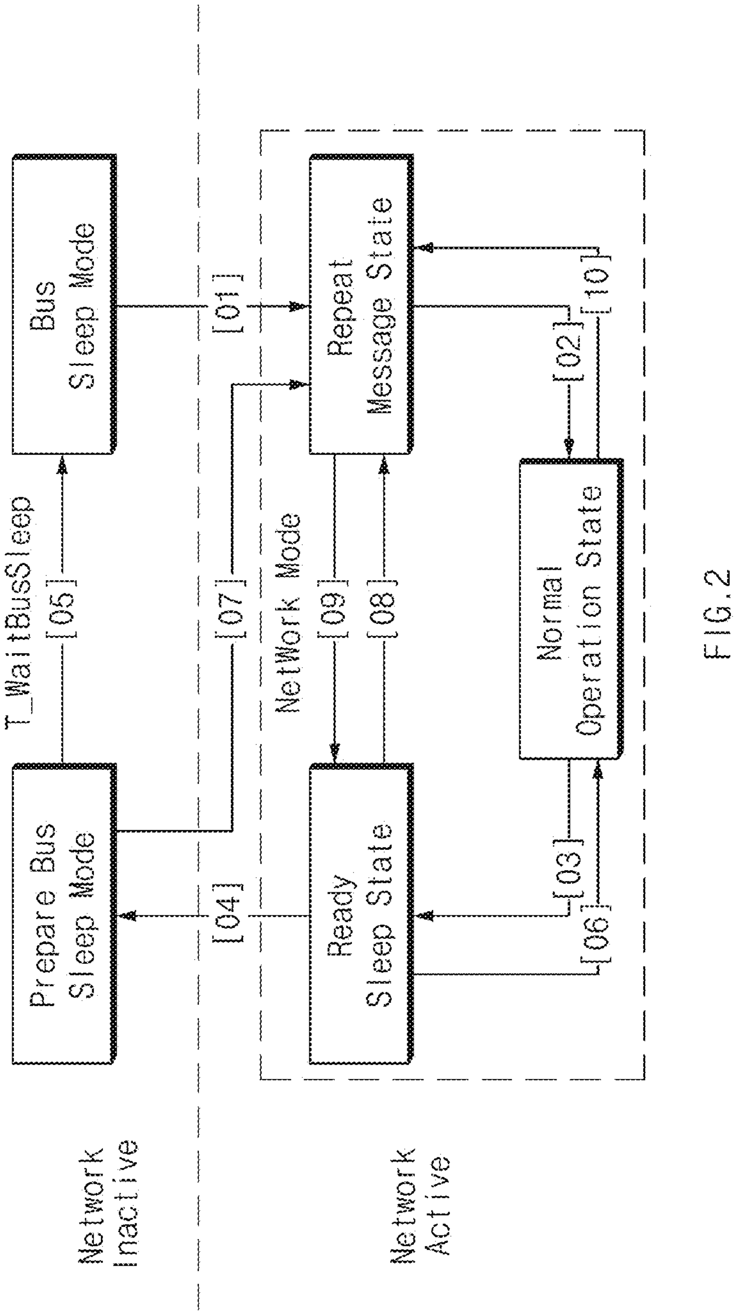
FIG. 2 is a diagram illustrating an example of the operating mode of an AUTOSAR NM algorithm that may be used in embodiments of the present disclosure.

For example, when an automotive open system architecture (AUTOSAR) network management (NM) algorithm is applied, as shown in FIG. 2, the controller 40 may determine a waiting time (T_WaitBusSleep) before entering a bus-sleep mode from a preparation bus-sleep mode as follows.

When the cumulative mileage of the vehicle does not exceed 3000 km, the controller 40 may determine the activation maintenance time of the target network to be 30 minutes.

When the cumulative mileage of the vehicle exceeds 3000 km and the battery SOC exceeds 65%, the controller 40 may determine the activation maintenance time of the target network to be 20 minutes.

When the cumulative mileage of the vehicle exceeds 3000 km, the battery SOC does not exceed 658, and the target network has no abnormal wake-up ECU information history, the controller 40 may determine the activation maintenance time of the target network to be 10 minutes.

When the cumulative mileage of the vehicle exceeds 3000 km, the battery SOC does not exceed 65%, and the target network has an abnormal wake-up ECU information history, the controller 40 may determine the activation maintenance time of the target network to be 1.5 seconds.

FIG. 2 is a diagram illustrating an example of the operating mode of an AUTOSAR NM algorithm that may be used in embodiments of the present disclosure.

As shown in FIG. 2, the operating mode of an AUTOSAR NM algorithm may include a network mode, a preparation bus-sleep mode, and a bus-sleep mode. The network mode may include a repeat message state, a normal operation state, and a ready sleep state.

The preparation bus-sleep mode or the bus-sleep mode may transition to the repeat message state of the network mode. The normal operation state indicates that the network is active. The ready sleep state waits without transitioning to the preparation bus-sleep mode as long as the network remains active. The preparation bus-sleep mode may wait for all ECUs to complete network activities (e.g. message transmission) before transitioning to the bus-sleep mode. For example, the preparation bus-sleep mode may wait for the transition to the bus-sleep mode through a waiting time timer. The bus-sleep mode may reduce the power consumption of the ECU while the ECU is completely inactive.

The controller 40 may monitor the target network during the activation maintenance time of the target network and may detect the ECU that wakes up abnormally first in the plurality of ECUs as an abnormal ECU.

The controller 40 may control an abnormal ECU based on the SOC of the battery in the vehicle status information. For example, the controller 40 may reset the abnormal ECU when the SOC of the battery exceeds the threshold and may shut down the abnormal ECU in conjunction with a PDC 500 when the SOC of the battery does not exceed the threshold.

In addition, when the SOC of the battery exceeds the threshold, the controller 40 may store a data log, record a diagnostic trouble code (DTC). The controller 40 may provide information about the abnormal ECU through the output device 30.

In addition, when the SOC of the battery does not exceed the threshold, the controller 40 may store the data log, record the DTC, and transmit a message notifying the detection of an abnormal ECU to a mobile terminal of a customer through the communication device 20.

Figure 3:
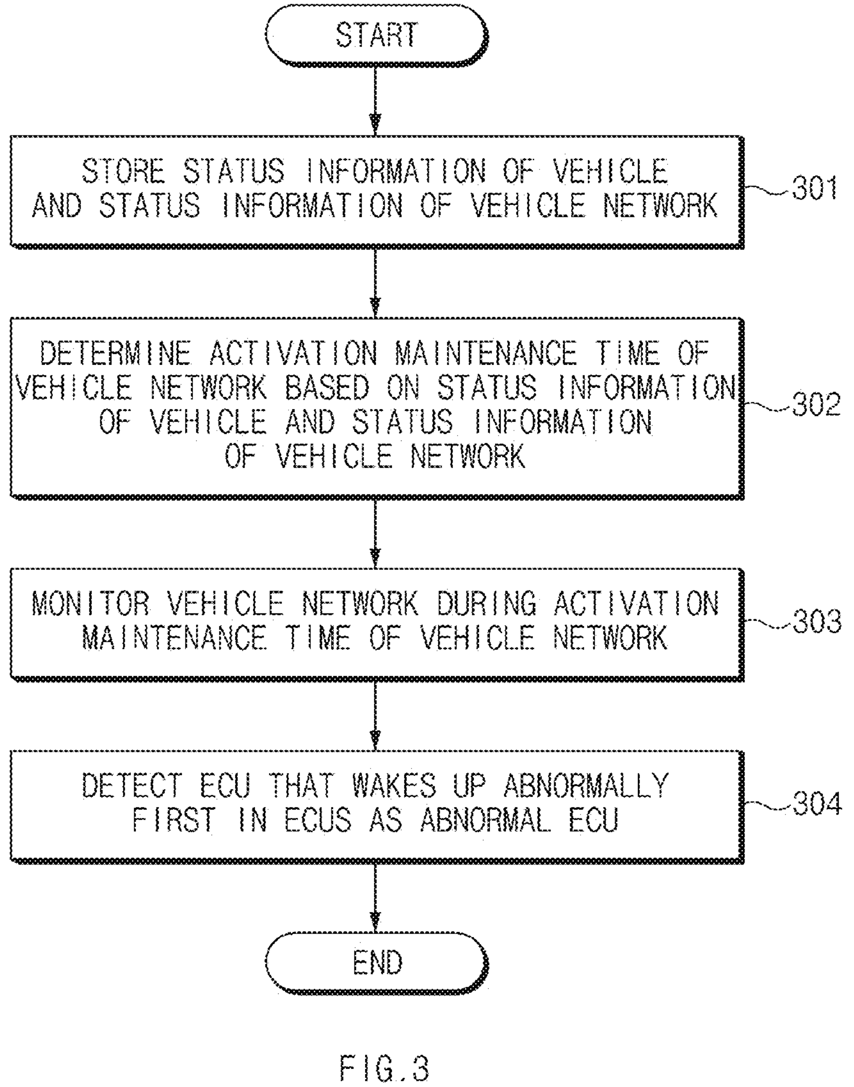
FIG. 3 is a flowchart illustrating a method of detecting an abnormal ECU in a vehicle network, according to an embodiment of the present disclosure.

FIG. 3 is a flowchart illustrating a method of detecting an abnormal ECU in a vehicle network, according to an embodiment of the present disclosure.

In an operation 301, the storage 10 stores the status information of the vehicle and the status information of the vehicle network.

In an operation 302, the controller 40 determines the activation maintenance time of the vehicle network based on the status information of the vehicle and the status information of the vehicle network.

In an operation 303, the controller 40 monitors the vehicle network during the activation maintenance time of the vehicle network.

In an operation 304, the controller 40 detects the ECU that wakes up abnormally first in the plurality of ECUs as an abnormal ECU.

Figure 4:
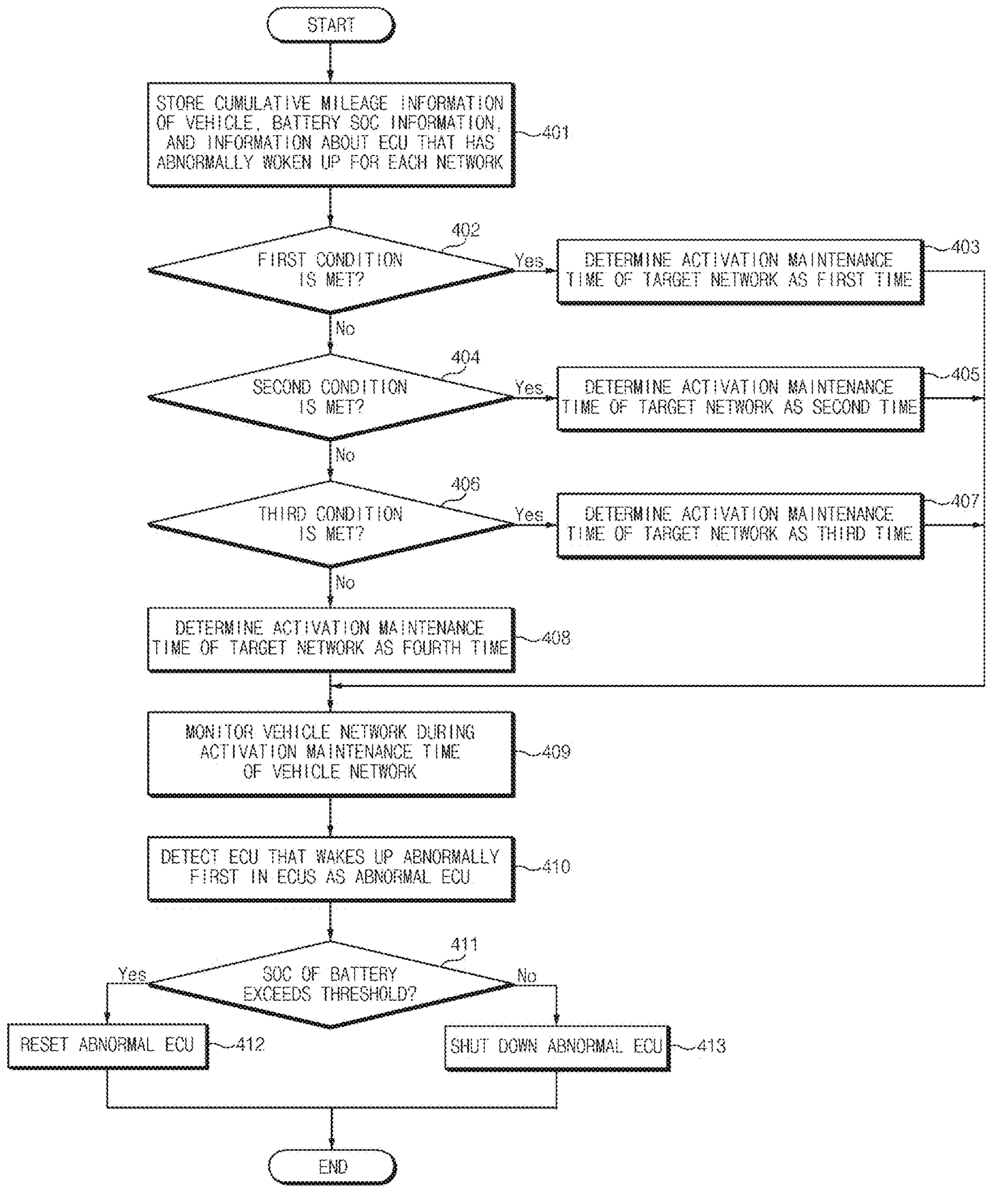
FIG. 4 is a detailed flowchart illustrating a method of detecting an abnormal ECU in a vehicle network, according to an embodiment of the present disclosure.

FIG. 4 is a detailed flowchart illustrating a method of detecting an abnormal ECU in a vehicle network, according to an embodiment of the present disclosure.

In an operation 401, the storage 10 stores the cumulative mileage information of the vehicle, battery SOC information, and the information about an ECU that has abnormally woken up for each network.

When the first condition is met, in operations 402 and 403, the controller 40 determines the activation maintenance time of the target network as the first time. The first condition may include a case where the cumulative mileage of the vehicle does not exceed the threshold distance.

In operations 404 and 405, when the second condition is met, the controller 40 may determine the activation maintenance time of the target network as the second time. The second condition may include a case where the cumulative mileage of the vehicle exceeds the threshold distance and the battery SOC exceeds the threshold.

When the third condition is met, in operations 406 and 407, the controller 40 may determine the activation maintenance time of the target network as the third time. The third condition may include a case where the cumulative mileage of the vehicle exceeds the threshold distance, the battery SOC does not exceed the threshold, and there is no history of information about an ECU that wakes up abnormally in the target network.

When the third condition is not met, in an operation 408, the controller 40 may determine the activation maintenance time of the target network as the fourth time. In this case, when the third condition is not met, the cumulative mileage of the vehicle exceeds the threshold distance, the battery SOC does not exceed the threshold, and there is a history of information about an ECU that wakes up abnormally in the target network.

In an operation 409, the controller 40 monitors the vehicle network during the activation maintenance time of the vehicle network.

In an operation 410, the controller 40 detects the ECU that wakes up abnormally first in the plurality of ECUs as an abnormal ECU.

In an operation 411, the controller 40 determines whether the SOC of the battery exceeds the threshold.

As a determination result in the operation 411, when the SOC of the battery exceeds the threshold, the abnormal ECU is reset in an operation 412.

As the determination result in the operation 411, when the SOC of the battery does not exceed the threshold, the abnormal ECU is shut down in an operation 413.

Figure 5:
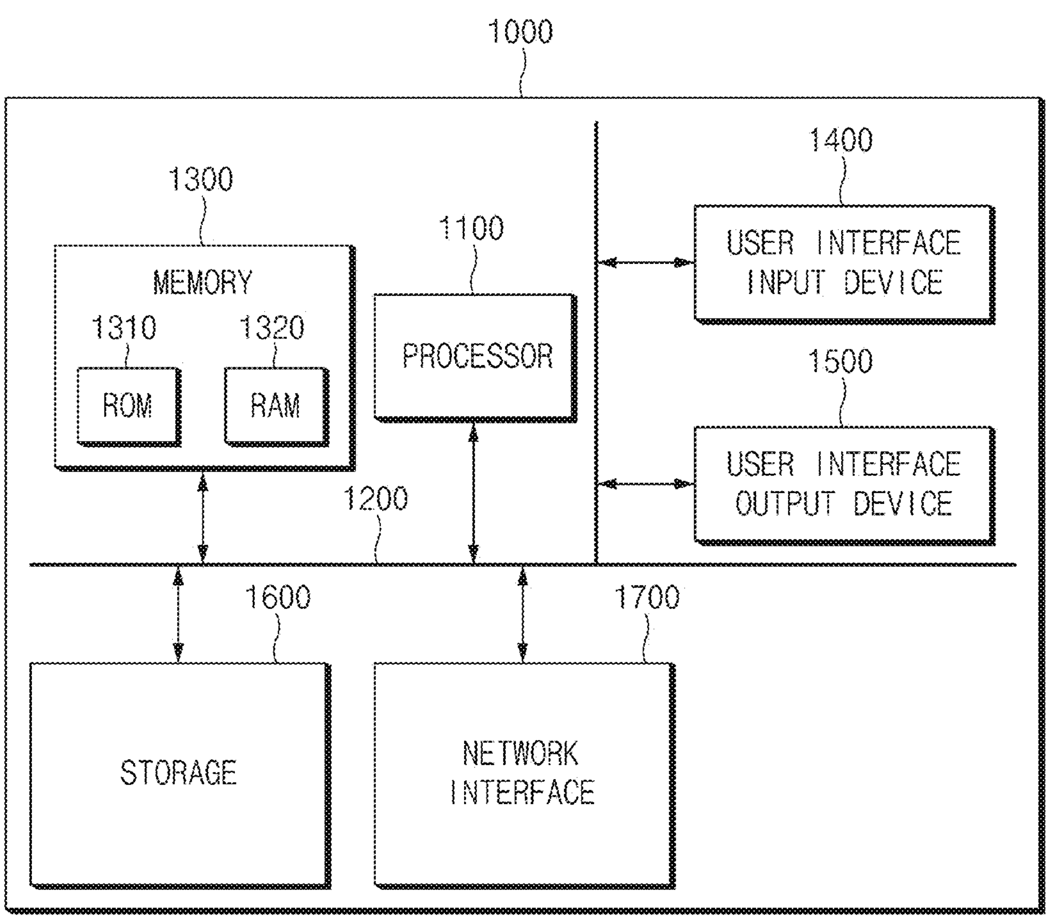
FIG. 5 is a block diagram illustrating a computing system for executing a method of detecting an abnormal ECU in a vehicle network, according to each embodiment of the present disclosure.

FIG. 5 is a block diagram illustrating a computing system for executing a method of detecting an abnormal ECU in a vehicle network, according to each embodiment of the present disclosure.

Referring to FIG. 5, a method of detecting an abnormal ECU in a vehicle network according to an embodiment of the present disclosure may be implemented through a computing system 1000. The computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the methods or algorithms according to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The storage medium may be coupled to the processor 1100. The processor 1100 may read information from the storage medium and may write information in the storage medium. In another embodiment, the storage medium may be integrated with the processor 1100. The processor 1100 and the storage medium may reside in an application specific integrated circuit (ASIC). The ASIC may reside in a user terminal. In another embodiment, the processor 1100 and the storage medium may reside in the user terminal as an individual component.

According to the embodiments of the present disclosure, it is possible to detect the abnormal ECU with high accuracy by storing status information of a vehicle and status information of the vehicle network, determining an activation maintenance time of the vehicle network based on status information of the vehicle and status information of the vehicle network, monitoring the vehicle network during the activation maintenance time of the vehicle network, and detecting an ECU that wakes up abnormally first in a plurality of ECUs as an abnormal ECU.

Although embodiments of the present disclosure have been described for illustrative purposes, those having ordinary skill in the art should appreciate that various s modifications, additions, and substitutions are possible without departing from the scope and spirit of the disclosure. Therefore, the embodiments described in the present disclosure are provided for the sake of descriptions, not limiting the technical concepts of the present disclosure. Accordingly, it should be understood that the described embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for detecting an abnormal ECU in a vehicle network, the apparatus comprising:
- storage configured to store status information of a vehicle and status information of the vehicle network, wherein the status information of the vehicle includes at least one piece of cumulative mileage information of the vehicle and state of charge (SOC) information of a battery provided in the vehicle; and
- a controller configured to
  - determine an activation maintenance time of the vehicle network based on the status information of the vehicle and the status information of the vehicle network,
  - monitor the vehicle network during the activation maintenance time of the vehicle network,
  - detect an electronic control unit (ECU) that wakes up abnormally first in a plurality of ECUs as an abnormal ECU, and
  - control the detected abnormal ECU based on an SOC of the battery.

2. The apparatus of claim 1, wherein the controller is configured to reset the abnormal ECU when the SOC of the battery exceeds a threshold.

3. The apparatus of claim 1, wherein the controller is configured to shut down the abnormal ECU when the SOC of the battery does not exceed a threshold.

4. The apparatus of claim 1, wherein the status information of the vehicle network includes ECU information about a plurality of ECUs that wakes up abnormally for each detailed network of the vehicle network.

5. The apparatus of claim 4, wherein the controller is configured to determine an activation maintenance time of a target network based on the cumulative mileage information of the vehicle and the SOC information of the battery, and the ECU information.

6. The apparatus of claim 5, wherein the controller is configured to determine the activation maintenance time of the target network as a first time when a cumulative mileage of the vehicle does not exceed a threshold distance.

7. The apparatus of claim 5, wherein the controller is configured to determine the activation maintenance time of the target network as a second time when a cumulative mileage of the vehicle exceeds a threshold distance and an SOC of the battery exceeds a threshold.

8. The apparatus of claim 5, wherein the controller is configured to determine the activation maintenance time of the target network as a third time when a cumulative mileage of the vehicle exceeds a threshold distance, an SOC of the battery does not exceed a threshold, and there is no information history of an ECU that wakes up abnormally in the target network.

9. The apparatus of claim 5, wherein the controller is configured to determine the activation maintenance time of the target network as a fourth time when a cumulative mileage of the vehicle exceeds a threshold distance, an SOC of the battery does not exceed a threshold, and there is an information history of an ECU that wakes up abnormally in the target network.

10. A method of detecting an abnormal ECU in a vehicle network, the method comprising:
- storing, by a storage, status information of a vehicle and status information of the vehicle network, wherein the status information of the vehicle includes at least one piece of cumulative mileage information of the vehicle and state of charge (SOC) information of a battery provided in the vehicle;
- determining, by a controller, an activation maintenance time of the vehicle network based on the status information of the vehicle and the status information of the vehicle network;
- monitoring, by the controller, the vehicle network during the activation maintenance time of the vehicle network;
- detecting, by the controller, an electronic control unit (ECU) that wakes up abnormally first in a plurality of ECUs as an abnormal ECU; and
- controlling, by the controller, the detected abnormal ECU based on an SOC of the battery.

11. The method of claim 10, wherein controlling the abnormal ECU includes:
- resetting, by the controller, the abnormal ECU when the SOC of the battery exceeds a threshold; and
- shutting down, by the controller, the abnormal ECU when the SOC of the battery does not exceed the threshold.

12. The method of claim 10, wherein the status information of the vehicle network includes ECU information about a plurality of ECUs that wakes up abnormally for each detailed network of the vehicle network.

13. The method of claim 12, wherein determining the activation maintenance time of the vehicle network includes determining, by the controller, an activation maintenance time of a target network based on the cumulative mileage information of the vehicle and the SOC information of the battery, and the ECU information.

14. The method of claim 13, wherein determining the activation maintenance time of the target network includes:
- determining, by the controller, the activation maintenance time of the target network as a first time when a cumulative mileage of the vehicle does not exceed a threshold distance;

determining, by the controller, the activation maintenance time of the target network as a second time when the cumulative mileage of the vehicle exceeds a threshold distance and an SOC of the battery exceeds a threshold;

determining, by the controller, the activation maintenance time of the target network as a third time when the cumulative mileage of the vehicle exceeds a threshold distance, an SOC of the battery does not exceed a threshold, and there is no information history of an ECU that wakes up abnormally in the target network; and determining, by the controller, the activation maintenance time of the target network as a fourth time when the cumulative mileage of the vehicle exceeds the threshold distance, an SOC of the battery does not exceed a threshold, and there is an information history of the ECU that wakes up abnormally in the target network.

* * * * *